US012251962B2

(12) United States Patent
Tessaro et al.

(10) Patent No.: US 12,251,962 B2
(45) Date of Patent: *Mar. 18, 2025

(54) SYSTEMS FOR AXLE ARM

(71) Applicant: DANA ITALIA S.R.L., Trentino (IT)

(72) Inventors: Nicola Tessaro, Arco (IT); Davide Deimichei, Arco (IT); Efrem Rusconi, Arco (IT); Gianluca Terrasi, Arco (IT)

(73) Assignee: DANA ITALIA S.R.L., Arco (IT)

( * ) Notice: Subject to any disclaimer, the term of this patent is extended or adjusted under 35 U.S.C. 154(b) by 555 days.

This patent is subject to a terminal disclaimer.

(21) Appl. No.: 17/456,831

(22) Filed: Nov. 29, 2021

(65) Prior Publication Data
US 2022/0185015 A1 Jun. 16, 2022

Related U.S. Application Data

(63) Continuation-in-part of application No. 17/450,051, filed on Oct. 5, 2021.

(30) Foreign Application Priority Data

Dec. 16, 2020 (DE) .......................... 202020107271.4

(51) Int. Cl.
| | | |
|---|---|---|
| *B60B 35/16* | (2006.01) | |
| *B60B 35/00* | (2006.01) | |
| *B60B 35/14* | (2006.01) | |
| *F16C 3/02* | (2006.01) | |
| *F16N 19/00* | (2006.01) | |

(52) U.S. Cl.
CPC .............. *B60B 35/16* (2013.01); *B60B 35/00* (2013.01); *B60B 35/14* (2013.01); *F16C 3/02* (2013.01); *F16N 19/003* (2013.01); *B60B 2900/561* (2013.01); *F16C 2326/06* (2013.01)

(58) Field of Classification Search
CPC ........ B60B 35/16; B60B 35/00; F16N 19/003
See application file for complete search history.

(56) References Cited

U.S. PATENT DOCUMENTS

| | | | | |
|---|---|---|---|---|
| 4,594,912 A | * | 6/1986 | Ishikawa ................. | B60B 35/16 |
| | | | | 74/606 R |
| 4,834,464 A | * | 5/1989 | Frehse .................. | F16C 33/723 |
| | | | | 384/624 |
| 6,485,110 B1 | * | 11/2002 | Lasko ................... | F16N 19/003 |
| | | | | 180/9.1 |
| 6,843,746 B2 | * | 1/2005 | Hayes .................... | B60K 17/16 |
| | | | | 184/6.12 |
| 6,938,731 B2 | | 9/2005 | Slesinski | |
| 8,739,932 B2 | | 6/2014 | Ramler | |
| 8,858,381 B2 | * | 10/2014 | Trost ................... | F16H 57/0445 |
| | | | | 475/160 |
| 9,458,965 B2 | * | 10/2016 | Kile ....................... | F16N 29/00 |
| 10,161,502 B2 | * | 12/2018 | Kwasniewski ..... | F16H 57/0445 |
| 2005/0005731 A1 | * | 1/2005 | Brill .................... | F16H 57/0434 |
| | | | | 74/607 |
| 2006/0063633 A1 | | 3/2006 | Turner et al. | |
| 2012/0058853 A1 | | 3/2012 | Schoon et al. | |

\* cited by examiner

*Primary Examiner* — Jason R Bellinger

(74) *Attorney, Agent, or Firm* — McCoy Russell LLP

(57) ABSTRACT

Systems are provided for an axle arm including a lubricant reservoir and a driveshaft. In one example, system may include a lubricant reservoir of an axle arm comprising a fill line at an edge of a driveshaft, wherein a central axis of the lubricant reservoir is misaligned with a central axis of the driveshaft.

16 Claims, 4 Drawing Sheets

US 12,251,962 B2

SYSTEMS FOR AXLE ARM

CROSS REFERENCE TO RELATED APPLICATIONS

The present application is a continuation-in-part of U.S. Non-Provisional patent application Ser. No. 17/450,051, entitled "Systems for Axle Arm", and filed on Oct. 5, 2021, and claims priority to German Utility Model Application No. 202020107271.4, entitled "Systems for Axle Arm", and filed on Dec. 16, 2020. The entire contents of each of the above-listed applications are hereby incorporated by reference for all purposes.

TECHNICAL FIELD

The present description relates generally to systems for an axle arm, more specifically to an axle arm arrangement configured to reduce an amount of oil in the axle arm.

BACKGROUND AND SUMMARY

Vehicles may include a driveshaft configured to transfer power from a motor to one or more wheels. The driveshaft may receive lubricant from a lubrication system fluidly coupled to other lubricated vehicle components. Lubricant demand may vary between components of the lubrication system, resulting in changes in lubricant flow. During some conditions, multiple components may demand higher lubricant flows. Thus, there may be a demand to decrease lubricant use in one or more components to increase an availability of lubricant.

Previous approaches may include a lubricant reservoir including a central axis aligned with an axis of the driveshaft. This design leads to a relatively high amount of lubricant within the arm. Thus, it may be desired to reduce an amount of lubricant held within an arm of the driveshaft while maintaining a desired lubrication and structural rigidity.

In one example, the issues described above may be addressed by a system comprising an oil reservoir of an axle arm including a fill line at an edge of a driveshaft, wherein a central axis of the oil reservoir is misaligned with a central axis of the driveshaft. In this way, an amount of lubricant below the central axis of the driveshaft is reduced.

As one example, the central axis of the driveshaft is arranged above the central axis of the lubricant reservoir. A first distance measured from a lower perimeter of the lubricant reservoir to the central axis of the driveshaft is less than a second distance measured from an upper perimeter of the lubricant reservoir to the drive shaft. Furthermore, the axle arm may include where the first distance is less than a diameter of the driveshaft. By shaping the reservoir in this way, an amount of lubricant below the driveshaft is reduced without impacting the axle arm performance and strength.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 2-5 are shown approximately to scale.

DETAILED DESCRIPTION

Figure 1:
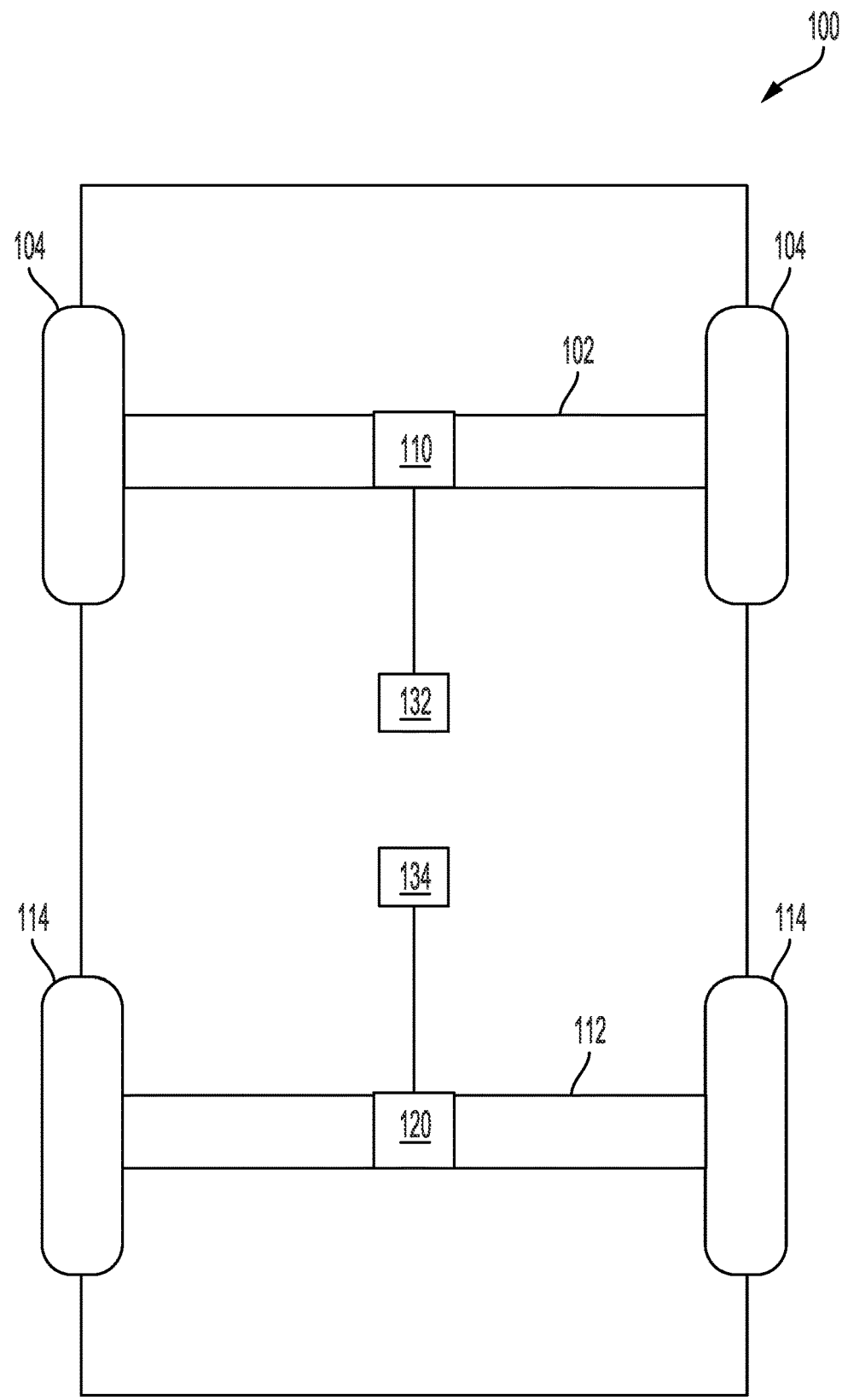
FIG. 1 shows an example vehicle system.
Figure 2:
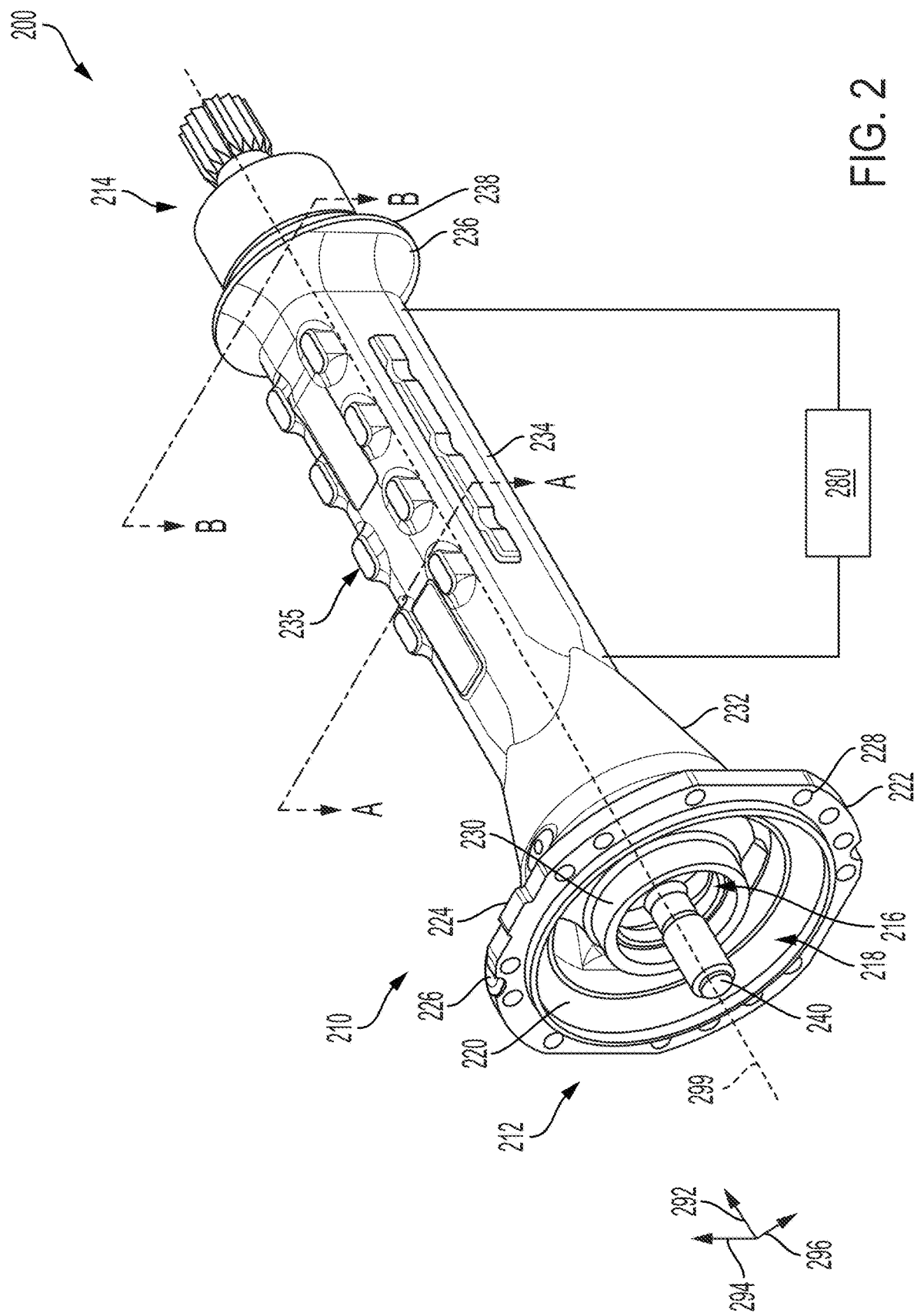
FIG. 2 shows an example configuration of an axle arm.
Figure 3:
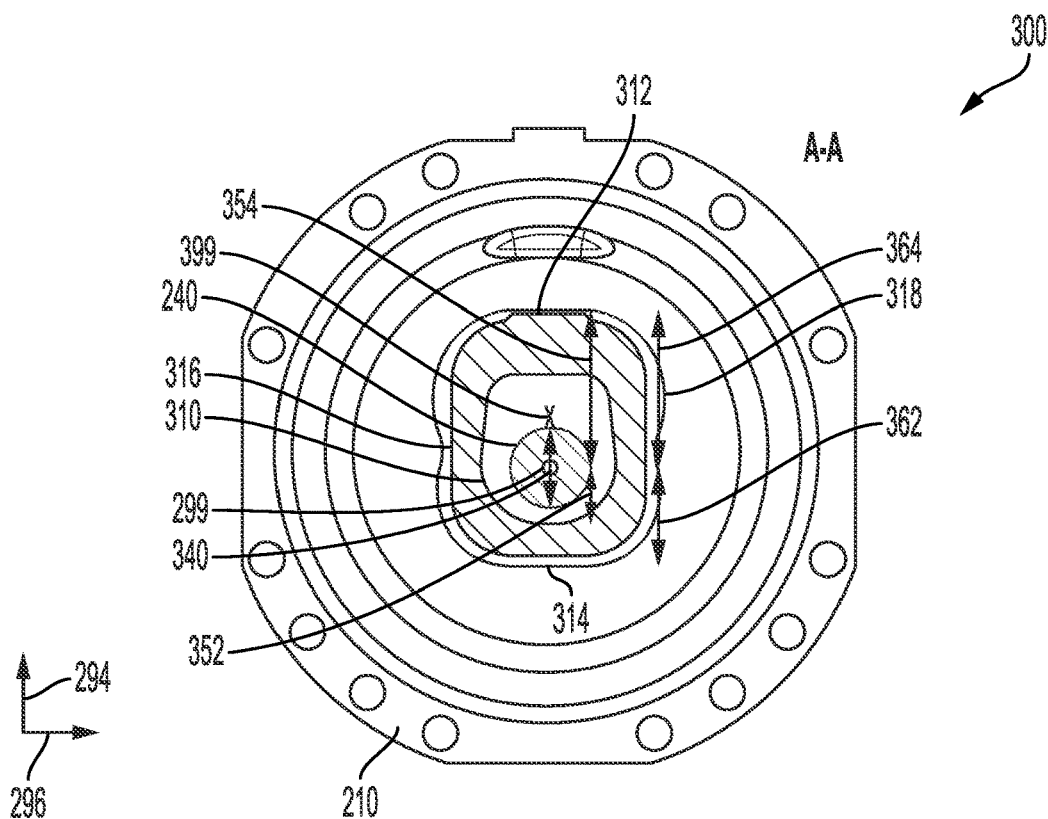
FIG. 3 shows a first cross-sectional view along a cutting plane A-A of the axle arm illustrating a lubricant reservoir and a driveshaft.
Figure 4:
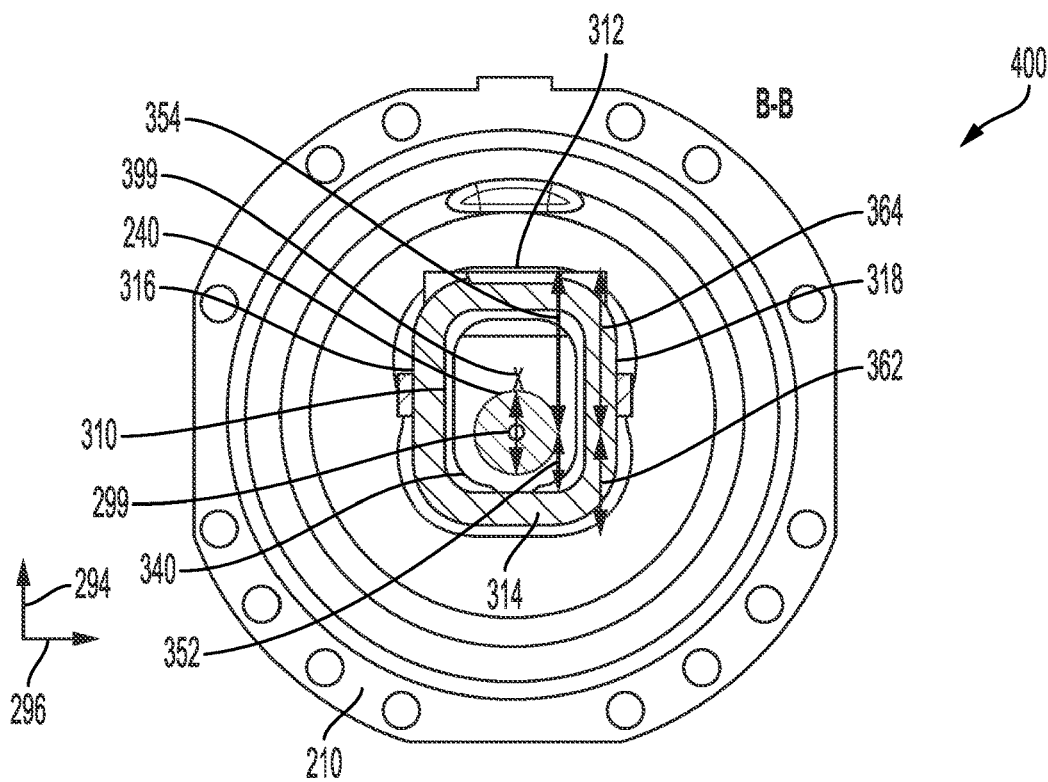
FIG. 4 shows a second cross-sectional view along a cutting plane B-B of the axle arm illustrating the lubricant reservoir and the driveshaft.
Figure 5:
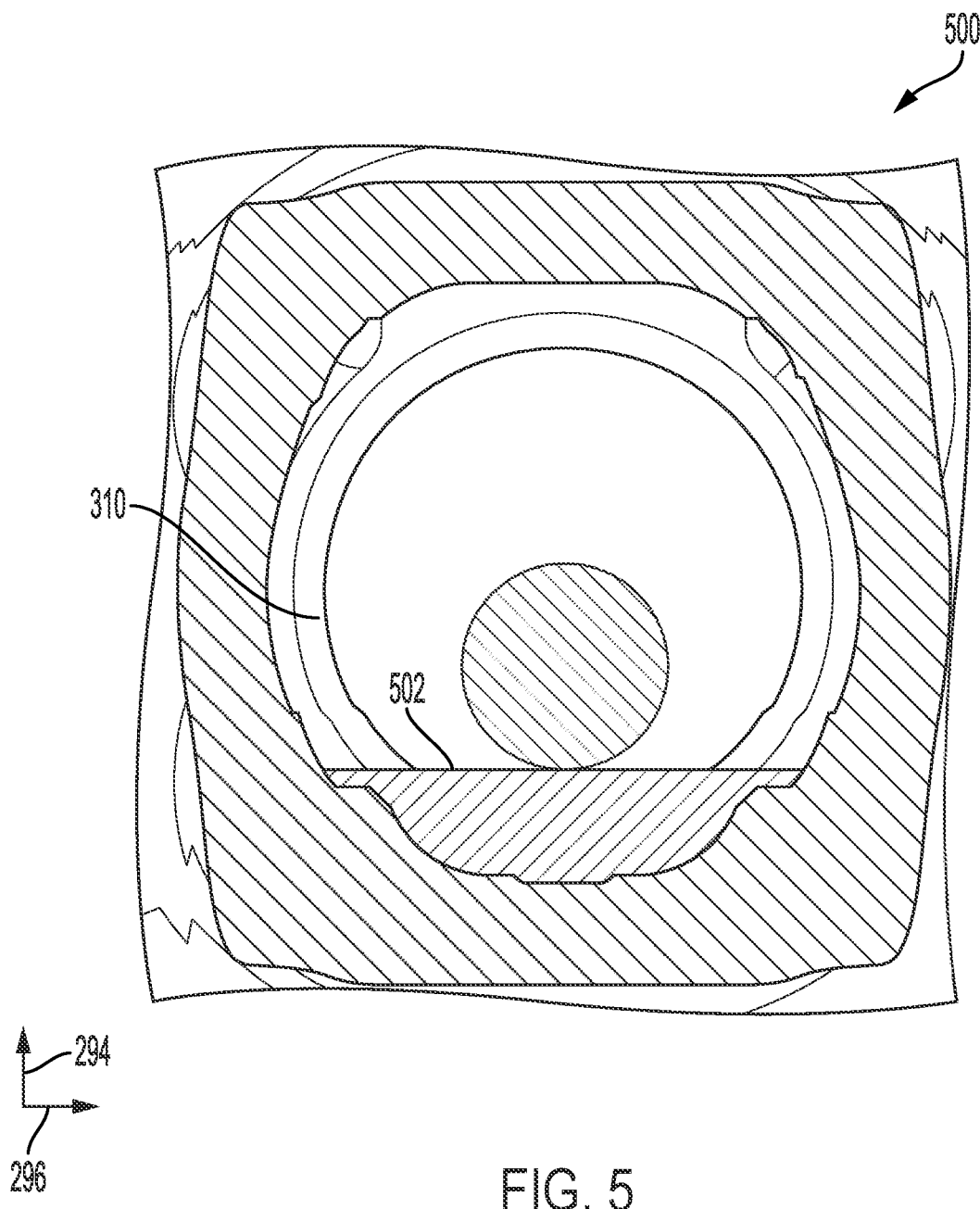
FIG. 5 shows an amount of lubricant arranged in the lubricant reservoir.

The following description relates to systems for an axle arm. The axle arm may include a lubricant reservoir and a driveshaft configured to transfer power to wheels of a vehicle, as shown in FIG. 1. An embodiment of the axle arm is shown in FIG. 2. A first cross-sectional view of the axle arm taken along a cutting plane A-A is shown in FIG. 3. A second cross-sectional view of the axle arm taken along a cutting plane B-B is shown in FIG. 4. An example lubricant level in the lubricant reservoir is illustrated in FIG. 5.

Turning now to FIG. 1, it shows a vehicle 100 comprising a first shaft 102 and a second shaft 112. The first shaft 102 may be configured to drive a first set of wheels 104 and the second shaft 112 may be configured to drive a second set of wheels 114. In one example, the first shaft 102 is arranged near a front of the vehicle 100 and the second shaft 112 is arranged near a rear of the vehicle 100.

In one example, the first shaft 102 and the second shaft 112 may include an axle arm housing a driveshaft. The driveshaft may be configured to rotate within a lubricant reservoir of the axle arm. When the driveshaft rotates, power may be transferred to the first and second sets of wheels.

A first electric motor 110 may be arranged on the first shaft 102 and a second electric motor 120 may be arranged on the second shaft 112. The first electric motor 110 may be configured to drive the first shaft 102, which may result in rotation of the first set of wheels 104. A first battery 132 may be configured to supply electrical energy to the first electric motor 110. The second electric motor 120 may be configured to drive the second shaft 112, which may result in rotation of the second set of wheels 114. A second battery 134 may be configured to supply electrical energy to the second electric motor 120. In some examples, additionally or alternatively, a single battery may be configured to supply electrical energy to each of the first electric motor 110 and the second electric motor 120.

The vehicle 100 is illustrated as an all-electric vehicle comprising one or more batteries for powering one or more electric motors to drive the vehicle. In one example, the vehicle 100 is an all-electric passenger vehicle. In some examples, additionally or alternatively, the vehicle 100 may be a hybrid vehicle including an engine configured to supply power to one or more of the first shaft 102 and the second shaft 112.

Turning now to FIG. 2, it shows an embodiment 200 of an axle arm 210. An axis system includes three axes, namely a longitudinal axis 292, a lateral axis 294, and a transverse axis 296. A central axis 299 of the axle arm 210 is parallel to the longitudinal axis 292. The figure shows the arm with axis 294 being a vertical axis with respect to a ground on which the vehicle travels, and thus illustrating a direction opposite gravity.

The axle arm 210 includes a first end 212 and a second end 214. The first end 212 may correspond to a first extreme end of the axle arm 210. The second end 214 may correspond to a second extreme end of the axle arm 210, opposite the first end 212.

The first end 212 may include an inner opening 216 through which a driveshaft 240 may extend. The first end 212 further includes an outer opening 218 surrounding the inner opening 216. A rim 230 may separate the inner opening 216 from the outer opening 218. The first end 212 may further include an outer ring 220 shaping an outer circumference of the outer opening. A first flange 222 may extend from the outer ring 220 in a radially outward direction, wherein a diameter of the first flange 222 is larger than a diameter of the outer ring 220.

The first flange 222 may include one or more surface features including a tab 224 and a pair of indentations 226 arranged along its perimeter. In one example, the tab 224 and the indentations 226 may align with a gearbox housing, a motor housing, or other type of housing. The first flange 222 may further include a plurality of dimples 228. The plurality of dimples 228 may face a direction away from the second end 214.

A first section 232 of the axle arm 210 is coupled to the outer ring 220 and extends therefrom. The first section 232 may include a conical shape. A diameter of the first section 232 may decrease in a direction toward the second end 214.

A second section 234 may be coupled to the first section 232. The second section 234 may include a uniform diameter and extend toward a third section 236 coupled to a second flange 238 of the second end 214. The second section 234 may further include a plurality of surface features including a plurality of protrusions 235. The plurality of protrusions 235 may include one or more ports, ribs, and the like.

The third section 236 may include a conical shape similar to the first section 232. The diameter of the third section 236 may decrease in a direction toward the first end 212 and away from the second end.

A lubricant system 280 may be fluidly coupled to a lubricant reservoir arranged within the axle arm 210. The driveshaft 240 may be arranged within the lubricant reservoir, wherein a portion of the driveshaft 240 may contact lubricant arranged therein. The lubricant reservoir in which the driveshaft 240 may rotate is described in greater detail below.

Turning now to FIGS. 3 and 4, they show a first internal-section 300 and a second internal-section 400, respectively. The first internal-section 300 illustrates an interior of the axle arm 210 at the plane A-A of FIG. 2. The second internal-section 400 illustrates an interior of the axle arm 210 at the plan B-B of FIG. 2. The first internal-section 300 and the second internal section 400 include a vantage point from the first end 212 toward the second end 214.

In FIG. 3, a lubricant reservoir 310 is illustrated along with a cross-section of the driveshaft 240. In one example, lubricant in the lubricant reservoir 310 is oil. The lubricant reservoir 310 may be shaped to extend through a center of the axle arm 210. The lubricant reservoir 310 may include an upper wall 312, a lower wall 314, a first side wall 316, and a second side wall 318. The upper wall 312 and the lower wall 314 may be parallel to one another and normal to each of the first side wall 316 and the second side wall 318. The first side wall 316 may be parallel to the second side wall 318.

A central axis of the driveshaft 240 may be aligned with the central axis 299. Herein, central axis 299 may refer to a central axis of the axle arm 210 and the driveshaft 240. In prior art examples including an axle arm and a lubricant reservoir including a driveshaft, an upper wall and a lower wall of the lubricant reservoir are equidistant to the central axis of the axle arm and the driveshaft. By doing this, an air gap between the driveshaft and the lower wall may be relatively large, resulting in a large amount of lubricant contained in the lubricant reservoir.

In the example of FIGS. 3 and 4, the dimensions of the lubricant reservoir 310 are adjusted relative to prior art examples without adjusting a corresponding section of the axle arm 210. By doing this, the amount of lubricant contained within the lubricant reservoir 310 is reduced, increasing a quantity of lubricant available for other components.

The lubricant reservoir 310 may be sized relative to the position of the driveshaft 240. A size of an air gap, defined by first dimension 352, may be reduced relative to the prior art examples. In one example, the first dimension 352 measures from an inner perimeter of the lower wall 314 to the central axis 299. The first dimension 352 may be less than a diameter 340 of the driveshaft 240.

A bottom distance 362 may measure from an outer perimeter of the lower wall 314 to the central axis 299. Thus, the bottom distance 362 is greater than the lower wall 314. A top distance 364 may measure from the central axis 299 to an outer perimeter of the upper wall 312. The top distance 364 may be greater than the bottom distance 362. Thus, a central axis 399 of the lubricant reservoir 310 may be misaligned with the central axis 299. In one example, the central axis 399 of the lubricant reservoir 310 is above the central axis 299. The reduction of the bottom distance and the first dimension 352 results in a reduction of the size of the air gap and less lubricant housed in the reservoir.

A second dimension 354 may measure from the upper wall 312 to the central axis 299. The second dimension 354 in the example of FIGS. 3 and 4 may be equal to a second dimension of the prior art examples. However, in the example of the present disclosure, the first dimension 352 is less than the second dimension 354, whereas in the prior art examples the first dimension is equal to the second dimension. By shaping the lubricant reservoir to reduce the size of the air gap without adjusting dimensions of the axle arm, an amount of lubricant below the driveshaft axis is reduced without impacting the axle arm 210 performance and strength. In one example, the dimensions of the lubricant reservoir 310 are adjusted to reduce an amount of lubricant arranged therein to a minimum threshold level. In one example, the minimum threshold level is based on a lowest amount of lubricant in the lubricant reservoir with a fill line still contacting a portion of the driveshaft 240.

As illustrated, a shape of the lubricant reservoir 310 may transition to a more rectangular shape from the first internal-section 300 to the second internal-section 400. In some examples, additionally or alternatively, the lubricant reservoir 310 may maintain a uniform shape through a longitudinal length of the axle arm 210 from the first internal-section 300 to the second internal-section 400.

Turning now to FIG. 5, it shows an example 500 of the lubricant reservoir 310 including lubricant arranged therein. In one example, the lubricant is oil. The lubricant reservoir may be filled with lubricant to a threshold fill line 502. In one example, the threshold fill line 502 corresponds to a fill line resulting in the oil level contacting at least a portion of the driveshaft 240. In one example, the threshold fill line contacts at least a bottom portion of the driveshaft 240. As the driveshaft 240 rotates, various portions of its circumference may contact the oil level, resulting in an entirety of the driveshaft 240 being lubricated with the reduced threshold fill line.

The technical effect of adjusting the lubricant reservoir dimensions without adjusting an axle arm size or driveshaft position is to decrease an amount of lubricant demanded to lubricate the driveshaft. By doing this, manufacture and assembly of the axle arm and driveshaft may be minimally adjusted while increasing a lubricant availability to other components of a lubricant system.

The disclosure provides support for a system including a lubricant reservoir of an axle arm comprising a fill line at an edge of a driveshaft, wherein a central axis of the lubricant reservoir is misaligned with a central axis of the driveshaft. A first example of the system further includes where the lubricant reservoir is arranged in an axle arm. A second example of the system, optionally including the first example, further includes where the central axis of the driveshaft aligns with a central axis of the axle arm. A third example of the system, optionally including one or more of the previous examples, further includes where interior surfaces of the axle arm shape the lubricant reservoir. A fourth example of the system, optionally including one or more of the previous examples, further includes where a first dimension measured from a bottom surface of the axle arm to the central axis of the driveshaft is less than a second dimension measured from a top surface of the axle arm to the central axis of the driveshaft. A fifth example of the system, optionally including one or more of the previous examples, further includes where the first dimension is less than a diameter of the driveshaft. A sixth example of the system, optionally including one or more of the previous examples, further includes where a bottom distance measured from an outer perimeter of a bottom surface of the axle arm to the central axis of the driveshaft is less than a top distance measured from an outer perimeter of a top surface of the axle arm to the central axis of the driveshaft, wherein the bottom surface and top surface shape the lubricant reservoir. A seventh example of the system, optionally including one or more of the previous examples, further includes where the edge of the driveshaft corresponds to a portion of the drive shaft nearest the bottom surface. An eighth example of the system, optionally including one or more of the previous examples, further includes where the fill line is below the central axis of the drive shaft.

The disclosure further provides support for an axle arm including a driveshaft arranged in a lubricant reservoir, wherein a fill line of lubricant reservoir contacts a bottom portion of the driveshaft. A first example of the axle arm further comprises where the bottom portion is a bottommost portion of the driveshaft. A second example of the axle arm, optionally including the first example, further includes where a central axis of the lubricant reservoir is misaligned with a central axis of the driveshaft. A third example of the axle arm, optionally including one or more of the previous examples, further includes where a first dimension measuring a height of an air gap from the central axis of the driveshaft to a lower wall is less than a second dimension measuring a height of the air gap from the central axis of the driveshaft to an upper wall, wherein the upper and lower walls define a portion of a perimeter of the lubricant reservoir. A fourth example of the axle arm, optionally including one or more of the previous examples, further includes where lubricant in the lubricant reservoir is oil. A fifth example of the axle arm, optionally including one or more of the previous examples, further includes where the lubricant reservoir changes in shape from a first end of the axle arm to a second end of the axle arm, the second end opposite the first end.

The disclosure further provides support for a system including an axle arm comprising an upper wall, a lower wall, a first lateral wall, and a second lateral wall, a lubricant reservoir shaped by the upper wall, the lower wall, the first lateral wall, and the second lateral wall, and a driveshaft configured to rotate within the lubricant reservoir, wherein a central axis of the driveshaft is aligned with a central axis of the axle arm and misaligned with a central axis of the lubricant reservoir. A first example of the system further includes where the central axis of the driveshaft is closer to the lower wall than the upper wall. A second example of the system, optionally including the first example, further includes where the central axis of the lubricant reservoir is vertically above the central axis of the driveshaft. A third example of the system, optionally including one or more of the previous examples, further includes where the axle arm is arranged in an electric vehicle. A fourth example of the system, optionally including one or more of the previous examples, further includes where a fill line of the lubricant reservoir contacts only a perimeter of the driveshaft.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle, comprising:
    an axle arm housing a lubricant reservoir, the lubricant reservoir comprising a fill line at an edge of a driveshaft, wherein a central axis of the lubricant reservoir is vertically misaligned with a central axis of the driveshaft; and
    a lubricant system coupled to the lubricant reservoir,
    wherein the vertical misalignment is with respect to gravity, and wherein the lubricant reservoir extends through a center of the axle arm,
    wherein a first dimension measured from a bottom surface of the axle arm to the central axis of the driveshaft is less than a second dimension measured from a top surface of the axle arm to the central axis of the driveshaft, and
    wherein the central axis of the driveshaft aligns with a central axis of the axle arm.

2. The system of claim 1, wherein interior surfaces of the axle arm shape the lubricant reservoir.

3. The system of claim 2, wherein the first dimension is less than a diameter of the driveshaft.

4. The system of claim 1, wherein a bottom distance measured from an outer perimeter of the bottom surface of the axle arm to the central axis of the driveshaft is less than a top distance measured from an outer perimeter of the top surface of the axle arm to the central axis of the driveshaft, and wherein the bottom surface and top surface shape the lubricant reservoir.

5. The system of claim 1, wherein the edge of the driveshaft corresponds to a portion of the driveshaft nearest the bottom surface, and wherein the driveshaft is arranged within the lubricant reservoir.

6. The system of claim 1, wherein the fill line is vertically below the central axis of the driveshaft, wherein the lubricant reservoir extends from a first end of the axle arm to a second end of the axle arm, and wherein the driveshaft enters the axle arm at the first end.

7. An axle arm system, comprising:
    a driveshaft arranged and configured to rotate in a lubricant reservoir positioned in an axle arm of the axle arm system, wherein a fill line for lubricant of the lubricant reservoir contacts a bottom portion of the driveshaft, wherein the lubricant reservoir changes in shape from a first end of the axle arm to a second end of the axle arm, the second end opposite the first end; and
    a lubricant system coupled to the lubricant reservoir.

8. The system of claim 7, wherein the bottom portion is a bottommost portion of the driveshaft.

9. The system of claim 7, wherein a central axis of the lubricant reservoir is misaligned with a central axis of the driveshaft.

10. The system of claim 9, wherein a first dimension measuring a height of an air gap from the central axis of the driveshaft to a lower wall is less than a second dimension measuring a height of the air gap from the central axis of the driveshaft to an upper wall, and wherein the upper and lower walls define a portion of a perimeter of the lubricant reservoir.

11. The system of claim 7, wherein lubricant in the lubricant reservoir is oil.

12. A system, comprising:
    an axle arm comprising an upper wall, a lower wall, a first lateral wall, and a second lateral wall;
    a lubricant reservoir shaped by the upper wall, the lower wall, the first lateral wall, and the second lateral wall; and
    a driveshaft configured to rotate within the lubricant reservoir, wherein a central axis of the driveshaft is vertically aligned with a central axis of the axle arm and vertically misaligned with a central axis of the lubricant reservoir.

13. The system of claim 12, wherein the central axis of the driveshaft is closer to the lower wall than the upper wall.

14. The system of claim 12, wherein the central axis of the lubricant reservoir is vertically above the central axis of the driveshaft.

15. The system of claim 12, wherein the axle arm is arranged in an electric vehicle.

16. The system of claim 12, wherein a fill line of the lubricant reservoir contacts only a perimeter of the driveshaft.

* * * * *